(12) United States Patent
Saha et al.

(10) Patent No.: US 6,404,817 B1
(45) Date of Patent: Jun. 11, 2002

(54) MPEG VIDEO DECODER HAVING ROBUST ERROR DETECTION AND CONCEALMENT

(75) Inventors: Angshuman Saha, Sunnyvale; Satish Soman, Cupertino, both of CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 08/975,524

(22) Filed: Nov. 20, 1997

(51) Int. Cl.$^7$ .................................................. H04N 7/50
(52) U.S. Cl. ............................... 375/240.27; 348/425.2; 375/240.12; 386/125; 714/747
(58) Field of Search ........................... 375/240, 240.27, 375/240.12; 348/390, 420, 845.1, 425.2; 386/125; 714/747

(56) References Cited

U.S. PATENT DOCUMENTS

| | | | | |
|---|---|---|---|---|
| 5,442,400 A | * | 8/1995 | Sun | 348/402 |
| 5,621,467 A | * | 4/1997 | Chien | 348/420 |
| 5,724,369 A | * | 3/1998 | Brailean | 714/747 |
| 5,835,149 A | * | 11/1998 | Astle | 348/419 |
| 5,910,827 A | * | 6/1999 | Kwan | 348/845.1 |

* cited by examiner

*Primary Examiner*—Howard Britton
(74) *Attorney, Agent, or Firm*—Conley, Rose & Tayon (57) ABSTRACT

A video decoder is provided with robust error handling and concealment. In one embodiment, the video decoder detects syntactic, semantic, and coding errors in encoded slices of macroblocks. An error handler determines the number of remaining un-decoded macroblocks in the corrupted slice and replaces these corrupted macroblocks using substitute DCT coefficient matrices and motion vectors. The zero-frequency DCT coefficient of each substitute matrix is set equal to the zero-frequency DCT coefficient of the last uncorrupted macroblock, while the higher frequency DCT coefficients are set equal to zero. The substitute motion vectors are provided from a concealment vector memory which buffers the motion vectors of the previous macroblock row. In this way, intelligent approximations are made for the missing macroblocks, effectively masking the video bitstream error.

26 Claims, 6 Drawing Sheets

MPEG VIDEO DECODER HAVING ROBUST ERROR DETECTION AND CONCEALMENT

BACKGROUND OF THE INVENTION

1. Field of the Invention

This invention relates to the field of video compression, and in particular to a video decoder which provides robust error detection and concealment.

2. Description of the Related Art

Full-motion digital video requires a large amount of storage and data transfer bandwidth. Thus, video systems use various types of video compression algorithms to reduce the amount of necessary storage and transfer bandwidth. In general, different video compression methods exist for still graphic images and for full-motion video. Intraframe compression methods are used to compress data within a still image or single frame using spatial redundancies within the frame. Interframe compression methods are used to compress multiple frames, i.e., motion video, using the temporal redundancy between the frames. Interframe compression methods are used exclusively for motion video, either alone or in conjunction with intraframe compression methods.

Intraframe or still image compression techniques generally use frequency domain techniques, such as the discrete cosine transform (DCT). Intraframe compression typically uses the frequency characteristics of a picture frame to efficiently encode a frame and remove spatial redundancy. Examples of video data compression for still graphic images are JPEG (Joint Photographic Experts Group) compression and RLE (run-length encoding). JPEG compression is a group of related standards that use the discrete cosine transform (DCT) to provide either lossless (no image quality degradation) or lossy (imperceptible to severe degradation) compression. Although JPEG compression was originally designed for the compression of still images rather than video, JPEG compression is used in some motion video applications. The RLE compression method operates by testing for duplicated pixels in a single line of the bit map and storing the number of consecutive duplicate pixels rather than the data for the pixels themselves.

In contrast to compression algorithms for still images, most video compression algorithms are designed to compress full motion video. As mentioned above, video compression algorithms for motion video use a concept referred to as interframe compression to remove temporal redundancies between frames. Interframe compression involves storing only the differences between successive frames in the data file. Interframe compression stores the entire image of an anchor frame or reference frame, generally in a moderately compressed format. Successive frames are compared with the anchor frame, and only the differences between the anchor frame and the successive frames are stored. Periodically, such as when new scenes are displayed, new anchor frames are stored, and subsequent comparisons begin from this new reference point. It is noted that the interframe compression ratio may be kept constant while varying the video quality. Alternatively, interframe compression ratios may be content-dependent, i.e. if the video clip being compressed includes many abrupt scene transitions from one image to another, the compression is less efficient. Examples of video compression which use an interframe compression technique are MPEG, DVI and Indeo, among others.

The compression standard referred to as MPEG (Moving Pictures Experts Group) compression is a set of methods for compression and decompression of full motion video images which uses the interframe and intraframe compression techniques described above. MPEG compression uses both motion compensation and discrete cosine transform (DCT) processes, among others, and can yield very high compression ratios.

The two predominant MPEG standards are referred to as MPEG-1 and MPEG-2. The MPEG-1 standard generally concerns inter-field data reduction using block-based motion compensation prediction (MCP), which generally uses temporal differential pulse code modulation (DPCM). The MPEG-2 standard is similar to the MPEG-1 standard, but includes extensions to cover a wider range of applications, including interlaced digital video such as high definition television (HDTV).

Interframe compression methods such as MPEG are based on the fact that, in most video sequences, the background remains relatively stable while action takes place in the foreground. The background may move, but large portions of successive frames in a video sequence are redundant. MPEG compression uses this inherent redundancy to encode or compress frames in the sequence.

An MPEG stream includes three types of pictures, referred to as the Intra (I) frame, the Predicted (P) frame, and the Bi-directional Interpolated (B) frame. The I (intra) frames contain the video data for the entire frame of video and are typically placed every 10 to 15 frames. Intraframes provide entry points into the file for random access, and are generally only moderately compressed. Predicted frames are encoded with reference to a past frame, i.e., a prior Intraframe or Predicted frame. Thus P frames only include changes relative to prior I or P frames. In general, P frames receive a fairly high amount of compression and are used as references for future P frames. Thus, both I and P frames are used as references for subsequent frames. Bi-directional pictures include the greatest amount of compression and require both a past and a future reference in order to be encoded. Bi-directional frames are never used as references for other frames.

In general, for the frame(s) following a reference frame, i.e., P and B frames that follow a reference I or P frame, only small portions of these frames are different from the corresponding portions of the respective reference frame. Thus, for these frames, only the differences are captured, compressed and stored. The differences between these frames are typically generated using motion vector estimation logic, as discussed below.

When an MPEG encoder receives a video file or bitstream, the MPEG encoder generally first creates the I frames. The MPEG encoder may compress the I frame using an intraframe compression technique. After the I frames have been created, the MPEG encoder divides respective frames into a grid of 16x16 pixel squares called macroblocks. The respective frames are divided into macroblocks in order to perform motion estimation/compensation. Thus, for a respective target picture or frame, i.e., a frame being encoded, the encoder searches for a best fit or best match between the target picture macroblock and a block in a neighboring picture, referred to as a search frame. For a target P frame, the encoder searches in a prior I or P frame, For a target B frame, the encoder searches in a prior and subsequent I or P frame. When a best match is found, the encoder transmits a vector movement code or motion vector. The vector movement code or motion vector includes a pointer to the best fit search frame block as well as information on the difference between the best fit block and the respective target block. The blocks in target pictures that have no change relative to the block in the reference or search frame are ignored. Thus the amount of data that is actually stored for these frames is significantly reduced.

After motion vectors have been generated, the encoder then encodes the changes using spatial redundancy. Thus, after finding the changes in location of the macroblocks, the NIPEG algorithm further calculates and encodes the difference between corresponding macroblocks. Encoding the difference is accomplished through a math process referred to as the discrete cosine transform or DCT. This process divides the macroblock into four sub-blocks, seeking out changes in color and brightness. Human perception is more sensitive to brightness changes than color changes. Thus the MPEG algorithm devotes more effort to reducing color space rather than brightness.

Therefore, MPEG compression is based on two types of redundancies in video sequences, these being spatial, which is the redundancy in an individual frame, and temporal, which is the redundancy between consecutive frames. Spatial compression is achieved by considering the frequency characteristics of a picture frame. Each frame is divided into non-overlapping blocks and respective sub-blocks, and each block is transformed via the discrete cosine transform (DCT).

After the transformed blocks are converted to the "DCT domain", each entry in the transformed block is quantized with respect to a set of quantization tables. The quantization step for each entry can vary, taking into account the sensitivity of the human visual system (HVS) to the frequency. Since the HVS is more sensitive to low frequencies, most of the high frequency entries are quantized to zero. In this step where the entries are quantized, information is lost and errors are introduced to the reconstructed image. Zero run length encoding is used to transmit the quantized values. The statistical encoding of the expected runs of consecutive zeroed-valued coefficients corresponding to the higher-order coefficients accounts for considerable compression gain.

In order to cluster non-zero coefficients early in the series and to encode as many zero coefficients as possible following the last non-zero coefficient in the ordering, the coefficient sequence is often organized in a specified orientation termed zigzag ordering. Zigzag ordering concentrates the highest spatial frequencies at the end of the series. Once the zigzag ordering has been performed, the encoder performs "run-length coding" on the AC coefficients. This process reduces each 8 by 8 block of DCT coefficients to a number of events represented by a non-zero coefficient and the number of preceding zero coefficients. Because the high-frequency coefficients are more likely to be zero, run-length coding results in additional video compression.

The video encoder then performs variable-length coding (VLC) on the resulting data. VLC is a reversible procedure for coding data that assigns shorter code words to frequent events and longer code words to less frequent events, thereby achieving additional video compression. Huffman encoding is a particularly well-known form of VLC that reduces the number of bits necessary to represent a data set without losing any information.

The final compressed video data is then ready to be transmitted to a storage device or over a transmission medium for reception and decompression by a remotely located decoder. Because of the picture dependencies, i.e., the temporal compression, the order in which the frames are transmitted, stored, or retrieved, is not necessarily the display order, but rather an order required by the decoder to properly decode the pictures in the bitstream. For example, a typical sequence of frames, in display order, might be shown as follows:

| I | B | B | P | B | B | P | B | B | P | B | B | I | B | B | P | B | B | P |
|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 |

By contrast, the bitstream order corresponding to the given display order would be as follows:

| I | P | B | B | P | B | B | P | B | B | I | B | B | P | B | B | P | B | B |
|---|---|---|---|---|---|---|---|---|---|---|---|---|---|---|---|---|---|---|
| 0 | 3 | 1 | 2 | 6 | 4 | 5 | 9 | 7 | 8 | 12 | 10 | 11 | 15 | 13 | 14 | 18 | 16 | 17 |

Because the B frame depends on a subsequent I or P frame in display order, the I or P frame must be transmitted and decoded before the dependant B frame.

As discussed above, temporal compression makes use of the fact that most of the objects remain the same between consecutive picture frames, and the difference between objects or blocks in successive frames is their position in the frame as a result of motion (either due to object motion, camera motion or both). The key to this relative encoding is motion estimation. In general, motion estimation is an essential processing requirement in most video compression algorithms. In general, motion estimation is the task of identifying temporal redundancy between frames of the video sequence.

The video decoding process is generally the inverse of the video encoding process and is employed to reconstruct a motion picture sequence from a compressed and encoded bitstream. The data in the bitstream is decoded according to a syntax that is defined by the data compression algorithm. The decoder must first identify the beginning of a coded picture, identify the type of picture, then decode each individual macroblock within a particular picture.

When encoded video data is transferred to a video decoder, the encoded video data is received and stored in a rate or channel buffer. The data is then retrieved from the channel buffer by a decoder or reconstruction device for performing the decoding process. When the MPEG decoder receives the encoded stream, the MPEG decoder reverses the above operations. Thus the MPEG decoder performs inverse scanning to remove the zigzag ordering, inverse quantization to de-quantize the data, and the inverse DCT to convert the data from the frequency domain back to the pixel domain. The MPEG decoder also performs motion compensation using the transmitted motion vectors to re-create the temporally compressed frames.

When frames are received which are used as references for other frames, such as I or P frames, these frames are decoded and stored in memory. When a reconstructed frame is a reference or anchor frame, such as an I or a P frame, the reconstructed frame replaces the oldest stored anchor frame and is used as the new anchor for subsequent frames.

When a temporally compressed or encoded frame is received, such as a P or B frame, motion compensation is performed on the frame using the neighboring decoded I or P reference frames, also called anchor frames. The temporally compressed or encoded frame, referred to as a target frame, will include motion vectors which reference blocks in neighboring decoded I or P frames stored in the memory. The MPEG decoder examines the motion vector, determines the respective reference block in the reference frame, and accesses the reference block pointed to by the motion vector from the memory.

In order to reconstruct a B frame, the two related anchor frames or reference frames must be decoded and available in a memory, referred to as the picture buffer. This is necessary since the B frame was encoded relative to these two anchor frames. Thus the B frame must be interpolated or reconstructed using both anchor frames during the reconstruction process.

After all of the macroblocks have been processed by the decoder, the picture reconstruction is complete. The resultant coefficient data is then inverse quantized and operated on by an IDCT process to transform the macroblock data from the frequency domain to data in the time and space domain. As noted above, the frames may also need to be re-ordered before they are displayed in accordance with their display order instead of their coding order. After the frames are re-ordered, they may then be displayed on an appropriate display device.

As described above, as the encoded video data is decoded, the decoded data is stored into a picture store buffer. In some configurations, the channel and picture buffers are incorporated into a single integrated memory buffer. The decoded data is in the form of decompressed or decoded I, P or B frames. A display processor retrieves the picture data for display by an appropriate display device, such as a TV monitor or the like.

DVD is a multimedia compression standard which incorporates MPEG for video compression, various audio compression techniques, and pixel run length compression for text displays. Each of the compressed audio, video, and text bitstreams may be available in more than one form (e.g. different languages, camera angles, option menus), and the multiple bitstreams are combined into one multimedia bitstream by packetizing the individual bitstreams and interleaving the bitstream packets. DVD has found wide applicability which includes digital television transmission and video games.

A compressed video bitstream can be corrupted during storage or transmission. It is desirable for a video decoder to include a mechanism for detecting and concealing errors in the video bitstream to minimize the viewer impact of the corruption upon the displayed video program. Such a mechanism would preferably not require unduly complex additional circuitry.

SUMMARY OF THE INVENTION

The problems outlined above are in large part solved by a video decoder with robust error handling and concealment. In one embodiment, the video decoder detects syntactic, semantic, and coding errors in encoded slices of macroblocks. An error handler determines the number of remaining un-decoded macroblocks in the corrupted slice and replaces these corrupted macroblocks using substitute DCT coefficient matrices and motion vectors. The zero-frequency DCT coefficient of each substitute matrix of an intra-coded macroblock is set equal to the zero-frequency DCT coefficient of the last uncorrupted macroblock, while the higher frequency DCT coefficients are set equal to zero. For macroblocks coded relative to other frames, all the DCT coefficients of each substitute matrix are set equal to zero. Substitute motion vectors are provided from a concealment vector memory which buffers the motion vectors of the previous macroblock row. In this way, intelligent approximations are made for the missing macroblocks, effectively masking the video bitstream error.

Broadly speaking, the present invention contemplates a video decoder which comprises a VLC (variable length code) decoder, a reorder circuit, an inverse quantizer, an inverse DCT circuit, and an error handler. The VLC decoder is configured to receive an encoded slice of macroblocks, configured to decode the encoded slice of macroblocks into a sequence of quantized coefficient groups, and further configured to provide an error signal indicating the detection of syntactic, semantic, and VLC errors in the encoded slice of macroblocks. The reorder circuit is coupled to receive the sequence of quantized coefficient groups from the VLC decoder and is configured to reorder elements of the quantized coefficient groups to form a sequence of quantized coefficient matrices. The inverse quantizer is coupled to receive the sequence of quantized coefficient matrices from the reorder circuit and is configured to individually scale elements of the quantized coefficient matrices to form a sequence of DCT (discrete cosine transform) coefficient matrices. The inverse DCT circuit is coupled to receive the sequence of DCT coefficient matrices from the inverse quantizer and is configured to convert the sequence of DCT coefficient matrices into a sequence of image difference blocks. The error handler is coupled to receive the error signal from the VLC decoder and configured to responsively determine a corrupted macroblock. The error handler is coupled to the inverse DCT circuit to replace the DCT coefficient matrix of the corrupted macroblock with a substitute DCT coefficient matrix.

The present invention further contemplates an error handler for a video decoder. The error handler comprises a central error handler and a DCT error handler. The central error handler is configured to receive an error signal from a VLC decoder and is configured to responsively assert a DCT matrix replacement signal. The DCT error handler circuit is coupled to receive the DCT matrix replacement signal from the central error handler and is configured to responsively provide a substitute DCT coefficient matrix. The error handler may further include a concealment memory and a motion error handler. In this case, the central error handler is further configured to responsively assert a motion vector replacement signal. The concealment memory is coupled to the VLC decoder to buffer a previous row of macroblock motion vectors, and the motion error handler circuit is coupled to receive the motion vector replacement signal and is configured to responsively provide a motion vector from the concealment memory.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
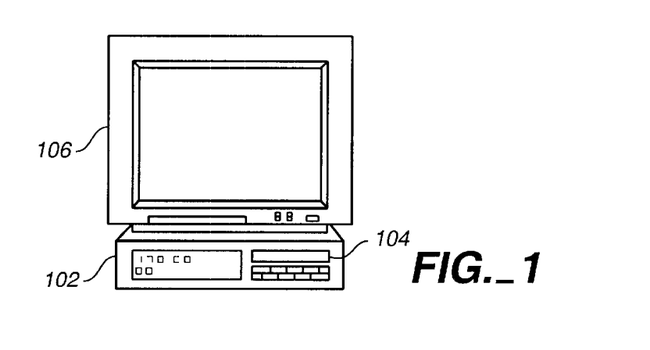
FIG. 1 shows an encoded multimedia playback device.

Turning now to the figures, FIG. 1 shows a video playback device 102 which includes a multimedia disk drive 104 and is coupled to a display monitor 106. Video playback device 102 includes a video decoder which advantageously provides for robust detection and concealment of errors in compressed video bitstreams. The device 102 accepts writeable multimedia disks in drive 104, and can store compressed video bitstreams to the multimedia disk and read compressed video bitstreams from the multimedia disk. The device 102 can also show the video display on display monitor 106.

Examples of display monitors 106 include: televisions, computer monitors, LCD/LED flat panel displays, and projection systems. The device 102 may also include audio capability, so that audio programs stored on the multimedia disk are playable. The system 102 would then include audio devices such as speakers, headphones, and/or audio recorders for reproducing the audio program.

In one embodiment, multimedia drive 104 is configured to accept a variety of optically readable disks. For example, audio compact disks, CDROMs, DVD disks, and DVD-RAM disks may be accepted. The drive 104 can consequently read audio programs and multimedia bitstreams. The drive 104 is also configured to write multimedia bitstreams, and may additionally be configured to write audio programs. The drive 104 includes a multimedia decoder which converts read multimedia bitstreams into video displays and audio programs. The drive 104 also includes a multimedia encoder for converting video displays and audio programs into a multimedia bitstream. A user can instruct the device 102 to forward the video displays and audio programs directly to the display monitor 106 for display and audio playback.

Figure 2:
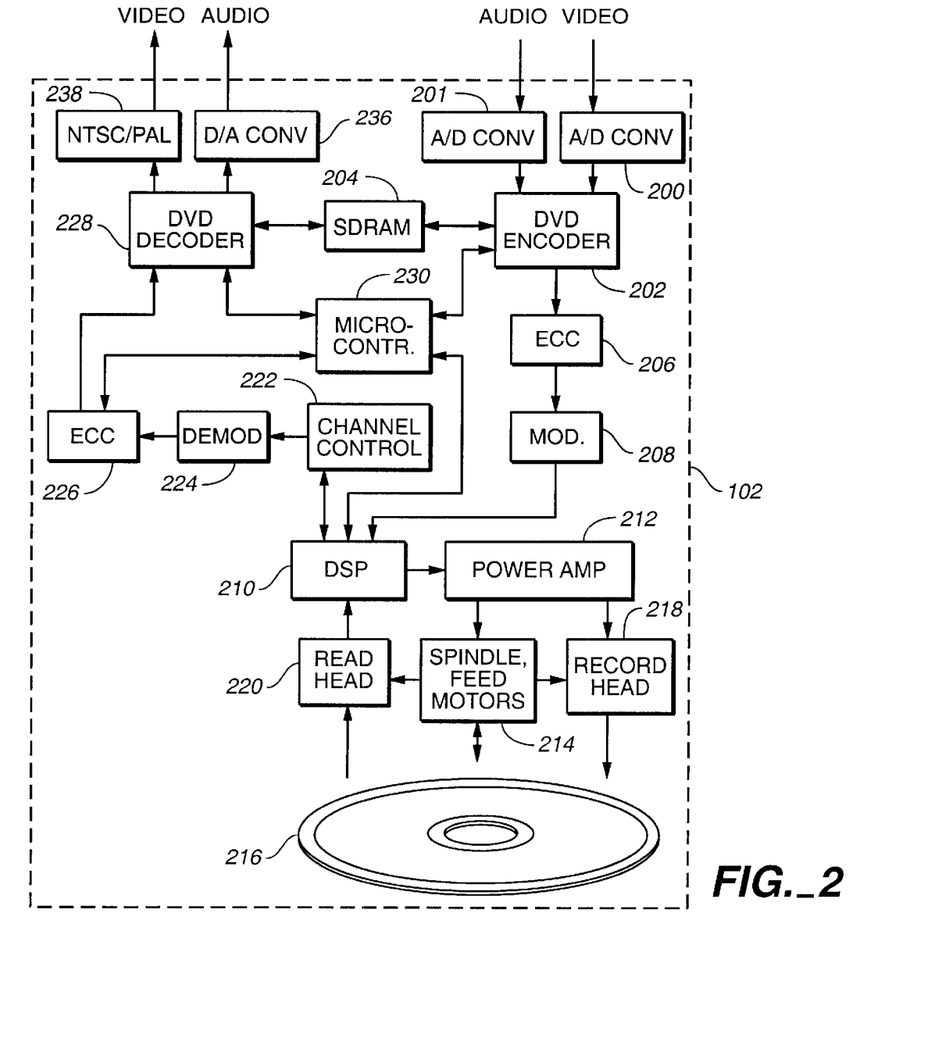
FIG. 2 is a functional block diagram of an encoded multimedia record and playback device.

Turning now to FIG. 2, a functional block diagram of a video playback device 102 is shown. The device 102 provides audio and video signals to the display monitor 106, and can accept audio and video signals from a television tuner or some other source. The received video and audio signals are converted to digital video and audio signals by A/D converters 200, 201. The digital audio and video bitstreams are provided to multimedia encoder 202. Multimedia encoder 202 uses synchronous dynamic random access memory (SDRAM) 204 as a frame store buffer while encoding the received signals. The resulting multimedia bitstream is processed by an error correction encoder 206 then converted to a modulated digital signal by modulator 208. The modulated digital signal is coupled to a digital signal processor (DSP) 210 and from there to a power amplifier 212. Amplified signals are coupled to drive motors 214 to spin a recordable multimedia disk 216, and to a record head 218 to store the modulated digital signal on the recordable multimedia disk 216.

Stored data can be read from the recordable multimedia disk 216 by read head 220 which sends a read signal to DSP 210 for filtering. The filtered signal is coupled to channel control buffer 222 for rate control, then demodulated by demodulator 224. An error correction code decoder 226 converts the demodulated signal into a multimedia bitstream which is then decoded by multimedia decoder 228. In decoding the multimedia bitstream, the multimedia decoder 228 produces digital audio and video bitstreams which are provided to D/A converters 236 and 238, which in turn provide the audio and video signals to display monitor 106. Video D/A 238 is typically an NTSC/PAL rasterizer for television, but may also be a RAMDAC for other types of video screens.

Multimedia encoder 202 operates to provide compression of the digital audio and video signals. The digital signals are compressed individually to form bitstreams which are then divided into packets which are inter-mixed to form the compressed multimedia bitstream. Various compression schemes may be used. Common audio compression schemes are MUSICAM, Dolby AC3, and Linear PCM. MPEG is an example of a suitable video compression scheme. DVD is a multimedia standard which combines the named audio and video compression schemes and which would serve well here.

In one embodiment, the general nature of the video compression performed by multimedia encoder 202 is MPEG encoding. The video compression may include subsampling of the luminance and chrominance signals, conversion to a different resolution, determination of frame compression types, compression of the frames, and re-ordering of the frame sequence. The frame compression may be intraframe compression or interframe compression. The intraframe compression is performed using a block discrete cosine transform with zig-zag reordering of transform coefficients followed by run length and Huffman encoding of the transform coefficients. The interframe compression is performed by additionally using motion estimation, predictive coding, and coefficient quantization.

Error correction encoder 206 and modulator 208 operate to provide channel coding and modulation for the output of the multimedia encoder 202. Error correction encoder 206 may be a Reed-Solomon block code encoder, which provides protection against errors in the read signal. The modulator 208 converts the error correction coded output into a modulated signal suitable for recording on multimedia disk 216.

DSP 210 serves multiple functions. It provides filtering operations for write and read signals, and it acts as a controller for the read/write components of the system. The modulated signal provided by modulator 208 provides an "ideal" which the read signal should approximate. In order to most closely approximate this ideal, certain nonlinear characteristics of the recording process must often be compensated. The DSP 210 may accomplish this compensation by pre-processing the modulated signal and/or post-processing the read signal. The DSP 210 controls the drive motors 214 and the record head 218 via the power amplifier 212 to record the modulated signal on the multimedia disk 216. The DSP 210 also controls the drive motors 214 and uses the read head 220 to scan the multimedia disk 216 and produce a read signal.

The channel control buffer 222 provides buffering of the read signal, while demodulator 224 demodulates the read signal and error correction code decoder 226 decodes the demodulated signal. After decoding the demodulated signal, the error correction decoder 226 forwards the decoded signal to multimedia decoder 228.

Multimedia decoder 228 operates to decode the output of the error correction decoder 226 to produce digital audio signals and video signals. The operation and structure of multimedia decoder 228 are discussed next. The digital audio signal and video signals may be converted to analog audio and video signals before being sent to display monitor 106.

Figure 3:
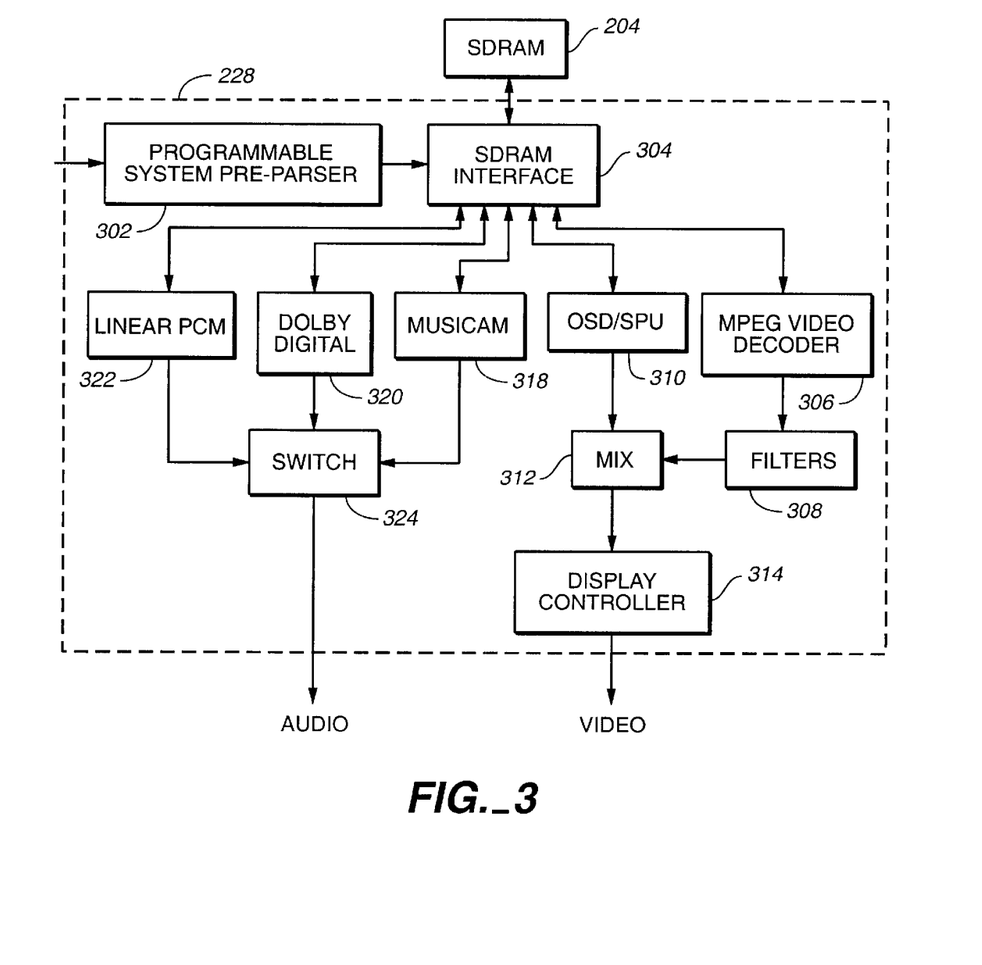
FIG. 3 is a functional block diagram of an encoded multimedia bitstream decoder.

Turning now to FIG. 3, a block diagram of multimedia decoder 228 is shown. Multimedia decoder 228 receives an encoded multimedia bitstream. The encoded multimedia bitstream is provided to a programmable system pre-parser 302 which parses the bitstream syntax, performs elementary operations to minimize the storage usage of the bitstream data, and routes the bitstream data to an appropriate buffer in memory 204 for further processing. In one embodiment, the memory 204 is a synchronous dynamic random access memory (SDRAM) which is accessed via a SDRAM interface 304. Data routed to the video decoder buffer is decoded by video decoder 306 and the decoded image data may be filtered by filters 308. Data routed to the sub-picture unit buffer is decoded by sub-picture unit 310 (SPU—also referred to as on-screen display unit or OSD). The decoded SPU signal may be masked onto the filtered image by mixer 312, and subsequently routed to display controller 314. The display controller 314 synchronizes the transfer of pixel data to rasterizer 238 for display on monitor 106.

Pre-parser 302 routes audio data to an audio buffer from which it is decoded by one of three audio decoders: MUSICAM decoder 318, Dolby Digital decoder 320, or Linear PCM decoder 322. The outputs of these decoders are routed to a multiplexing switch 324 which may be set to route the decoded digital audio signal to audio D/A converter 236.

The compressed video bitstream stored in the video buffer consists of "slices" each representing a horizontal section of an image frame. Each slice consists of a slice header and a sequence of macroblocks. The slice header contains information on the entire slice as a whole. Macroblocks may be broken up into a macroblock header, a motion vector, and coded blocks of DCT coefficients. The macroblock headers contain parameters relevant to the decoding of the macroblock. The motion vector section contains parameters which are used to determine the motion vectors for the macroblock. The DCT coefficients are extracted from the bitstream following the motion vectors. In the extraction of the motion vectors and DCT coefficients, the parameters for the macroblock header are used. More details on the MPEG1 and MPEG2 syntaxes may be found in the ISO 13818-2 specification. Most of the macroblock parameters in the compressed video bitstream are variable length code (VLC) encoded. Huffman coding is a popular VLC coding method.

For one or more reasons, symbol errors may be introduced in the compressed video bitstream. These symbol errors may lead to a syntax error, a semantic error, or a VLC coding error. Syntax errors occur when a certain expected bit pattern does not appear in the bitstream. One example of a syntax error would be a missing end-of-block bit pattern, i.e. the 64th DCT coefficient of a block is not followed by an end-of-block marker. Any violation of the MPEG syntax in the bitstreams should be flagged.

Semantic errors are those which would result in the incorrect operation of the decoder. One example of a semantic error is the motion vector going out of the range of the picture. Even though the parameters of a motion vector may have been extracted from the bitstream without errors, it is meaningless to have a motion vector that refers to nonexistent data.

The various parameters and the compressed video bitstream are VLC encoded. During VLC decoding the pattern appearing in the bitstream is matched against a group of patterns from a lookup table. If none of the patterns in the lookup table matches with the pattern in the bitstream, a VLC coding error results.

Figure 4:
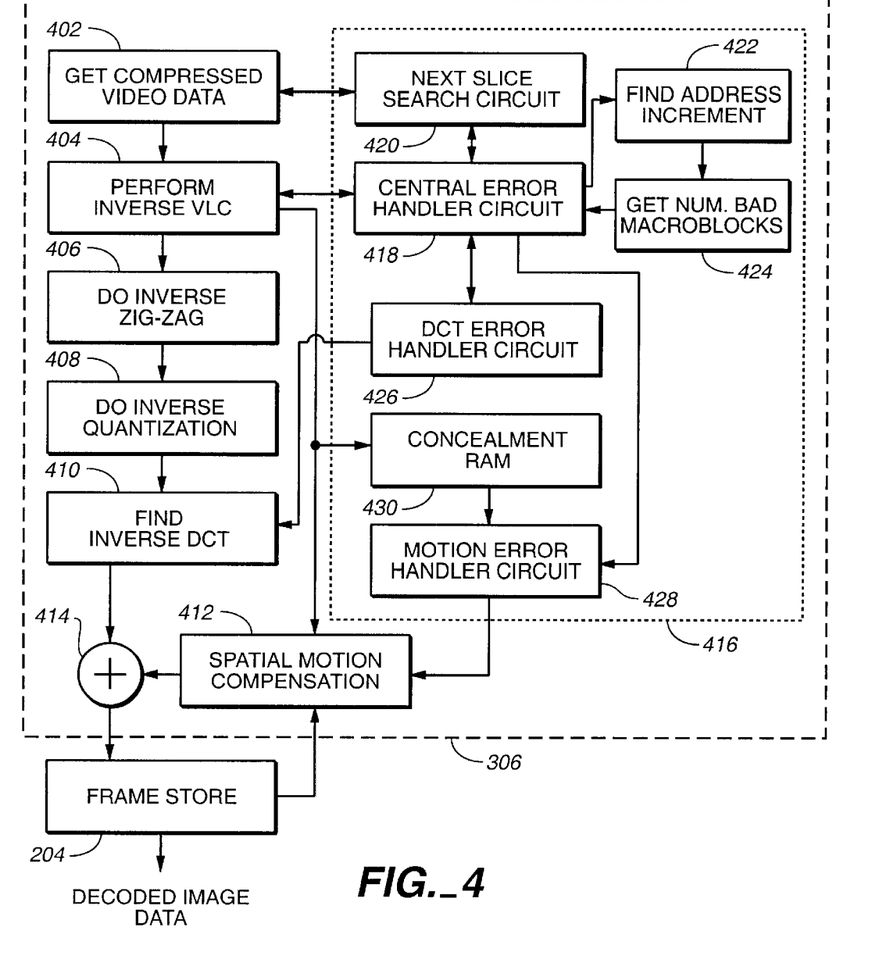
FIG. 4 is a functional block diagram of a video decoder with robust error handling and concealment.

Turning now to FIG. 4, a functional block diagram of video decoder 306 is shown. Block 402 is an interface that retrieves compressed video data from the video buffer in memory 204. Block 404 is a bitstream decoder which parses the bitstream and performs VLC decoding to extract the slice header information, the macroblock header information, the motion vector information, and the DCT coefficient information. The DCT coefficient information is provided to block 406 which re-orders DCT coefficient information to form a quantized DCT matrix. Block 408 receives the quantized DCT matrix and scales the elements to obtain a decompressed DCT matrix. Block 410 converts the decompressed DCT matrix into an image correction block.

Block 404 provides motion vector information indicative of a reference image block to block 412. Block 412 retrieves the reference image block from the frame store in memory 204 and provides it to adder 414. Adder 414 combines the reference image block with the image correction block to produce a decoded image block which may then be stored in the frame store.

Each of the error types listed above may occur in four regions: the slice header, the macroblock header, the motion vector, and the DCT coefficients. The following errors may be detected: unexpected start code, missing start code, motion vector out of range, DCT coefficient out of range, slice position out of range, zero quantizer scale value, invalid macroblock address increment, invalid macroblock type, invalid motion type, invalid marker bit, invalid slice address, VLC coding error, and missing end of block (EOB) code.

Unexpected start code: Every frame and slice within the frame begins with a start code for the purpose of re-synchronization in the event of an error. An unexpected start code (i.e., a start code found outside of a slice or frame header) is interpreted to be unexpected end of frame or end of slice and appropriate error handling is done.

Missing start code: A start code is expected at the end of each slice of macroblocks. This triggers a search for the next start code.

Motion vector out of range: A motion vector out of range error is detected when a decoded motion vector refers to a macroblock positioned outside of the frame.

DCT coefficient out of range: A DCT coefficient out of range error is detected when the DC coefficient is negative or greater than the specified precision value will allow.

Slice position out of range: A slice position out of range error is detected when the vertical position of the slice specified in the slice header is outside the boundary of the frame.

Zero quantizer scale value: The quantizer scale value is supposed to be nonzero, and an error is flagged if it is not.

Invalid macroblock address increment: In an I-frame an address increment not equal to one is considered to be an error. In P- or B-frames, skipped macroblocks cannot go past the end of a row. Consequently, if address increment causes the number of skipped macroblocks to be larger than the number of remaining macroblocks in a row, an error is detected.

Invalid macroblock type: If a non-intra-macroblock is found in an I-frame slice, an error is detected.

Invalid motion type: If the motion type is zero, an error is detected.

Invalid marker bit: A marker bit is expected at the end of 384 DCT coefficients in a D-frame, and after a concealment vector in an intra-macroblock. Error is detected if the marker bit is not 1.

Invalid slice address: If the slice addressing goes backwards, this will be detected as an error.

VLC coding error: An invalid VLC codeword is detected as an error.

Missing EOB: An EOB code is expected before or immediately after the 64th coefficient of a block. An error is detected if one is not found.

The detection of errors occurs in block 404. In one embodiment, the errors are classified into two categories. Class 1 errors are those which are detected prior to the forwarding of the motion vectors, and class 2 errors are those which are detected during or after the forwarding of the motion vectors. Possible class 1 errors include: unexpected start code, missing start code, motion vector out of range, slice position out of range, zero quantizer scale value, invalid macroblock address increment, invalid macroblock type, invalid motion type, invalid marker bit, invalid slice address, and DCT VLC coding error. Possible class 2 errors include: unexpected start code, DCT coefficient out of range, VLC coding error, and missing end of block (EOB) code.

Video decoder 306 advantageously includes an error handler 416 which operates to conceal errors by filling in data for corrupted macroblocks. After an error is detected, error handler 416 fills in data for the current macroblock and the rest of the macroblocks in the current slice, and conducts a search for the start code indicating the beginning of the next slice. The error handler 416 generates substitute DCT coefficient matrices and motion vectors for corrupted macroblocks. One distinction in the handling of class 1 errors and class 2 errors rests in the handling of the current macroblock. In class 1 errors the error handler 416 is able to provide both DCT coefficients and a motion vector for the current macroblock, whereas in class 2 errors the motion vector has already been forwarded and the error handler 416 is able to provide only the DCT coefficients for the current macroblock.

In the embodiment shown in FIG. 4, error handler 416 includes a central error handler circuit 418, a next slice search circuit 420, a find address increment circuit 422, a number of bad macroblocks determination circuit 424, a DCT error handler circuit 426, a motion error handler circuit 428, and a concealment RAM 430. When central error handler circuit 418 is notified of a class 1 or class 2 error by block 404, it initiates a search for the beginning of the next slice by next slice search circuit 420. When next slice search circuit 420 locates a slice start code, it identifies and provides the vertical position of the slice to central error handler circuit 418. Find address increment circuit 422 uses the vertical position of the next slice to determine the address of the next (hopefully) uncorrupted macroblock. The number of bad macroblock determination circuit 422 compares the address of the next uncorrupted macroblock with the address of the current macroblock to determine the number of corrupted macroblocks. This number is then provided to central error handler circuit 418.

Central error handler circuit 418 directs DCT error handler circuit 426 to provide substitute DCT coefficients for each of the corrupted macroblocks. Central error handler circuit 418 also directs motion error handler circuit 428 to provide a substitute motion vector for each of the corrupted macroblocks in a class 1 error, or for each of the corrupted macroblocks after the current macroblock in a class 2 error. In one embodiment, the DCT error handler circuit 426 provides 384 substitute DCT coefficients for the macroblock. The first, constant coefficient of the 8×8 pixel blocks are set to the values of the corresponding coefficients of the last uncorrupted macroblock for intra-coded macroblocks (such as those of the first I-frame in a video sequence), and the higher spatial frequency coefficients are set to zero. For macroblocks coded relative to other frames, all the DCT coefficients are set to zero. In this embodiment, the motion error handler circuit 428 accesses a concealment memory 430 to determine a substitute motion vector. The concealment memory 430 is configured to buffer one row's worth of motion vectors so that if a corrupted macroblock is detected, the motion vector for the corresponding macroblock of the previous row is available for use as a substitute motion vector. It is noted that whenever a macroblock does not have an associated motion vector (e.g. an intra-coded macroblock), a zero value motion vector is written to the concealment memory. When a substitute motion vector is required, the motion error handler circuit 428 retrieves the motion vector for the corresponding macroblock of the previous row and provides it to spatial motion compensation block 412.

A special condition exists in determining substitute DCT coefficients for an I-frame which is not the first in the frame sequence. In this case all of the DCT coefficients are set to zero and a zero value motion vector is generated to induce the copying of the corresponding macroblock from the previous anchor frame. In an alternate embodiment of error handler 416 this is how all corrupted macroblocks are concealed, i.e. all DCT coefficients are set to zero and a zero valued motion vector is generated.

In one embodiment of video decoder 306, a conceal-only-once mode is provided. In this mode, the video decoder performs concealment of only one detected error per frame, and if a second error is detected, the current frame is skipped and the previous anchor frame is displayed instead.

Figure 5:
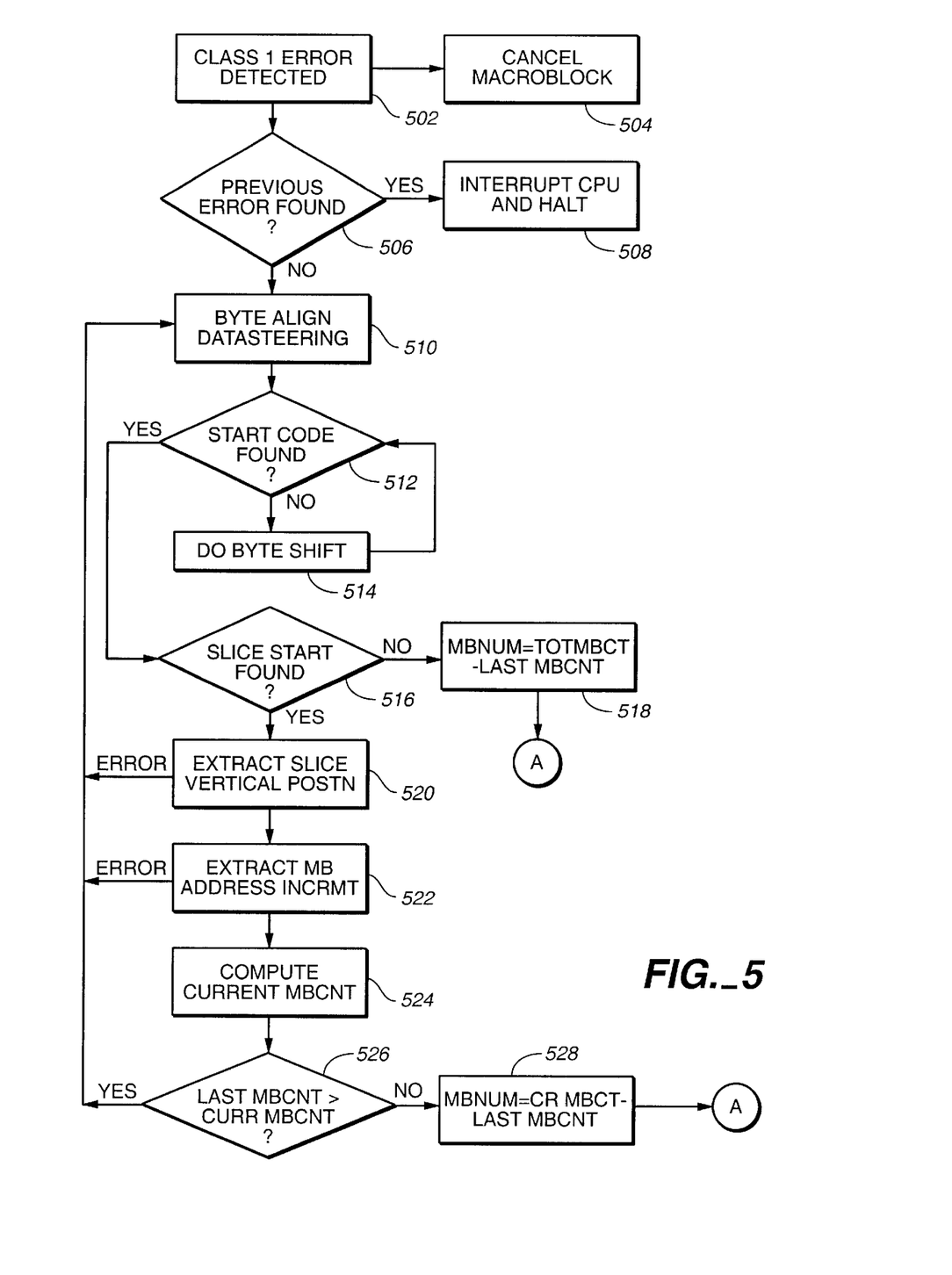
FIG. 5 is a flowchart illustrating a first aspect of the operation of an error handler.

Turning now to FIG. 5, a flow chart is provided to illustrate the operation of one embodiment of error handler 416. In block 502, error handler 416 is notified of a class one error. In block 504 error handler 416 cancels the decoding of the current macroblock. The same time in block 506, error handler 416 checks to determine if a previous error has been detected. If so, and if the decoder is in a conceal-only-once mode, then in block 508 error handler 416 issues a CPU interrupt and halts the operation of the video decoder. Otherwise in block 510, error handler 416 does a byte alignment of the bitstream data, then enters a loop in blocks 512 and 514. In the loop error handler 416 checks for a start code in the retrieved data, and if it is not found, error handler 416 retrieves another byte and repeats the loop. Error handler 416 exits the loop when a start code is found and in block 516 checks to see if the start code is a slice start code. If the start code is other than a slice start code, in block 518 error handler 416 computes the number of corrupted macroblocks by subtracting the last macroblock count from the total number of macroblocks in a picture. Once the number of corrupted macroblocks has been calculated, the operation of error handler 416 moves to point A in FIG. 6. If the start code is a slice start code error handler 416 determines the vertical position of the slice and the address of the first macroblock in the slice in blocks 520 and 522. If either these is determined to be an invalid value (e.g. the vertical position or the macroblock address is less than the previous position or address) error handler 416 returns to block 510 to initiate a new search for the next slice start code. Otherwise in block 524 error handler 416 determines the macroblock count of the first macroblock in the next slice, hereafter called the current macroblock count. In block 526 error handler 416 verifies that the current macroblock count is greater than the last macroblock count. If it is not, the error handler 416 determines to block 510 to initiate a new search for the next slice start code. Otherwise the error handler 416 computes the number of corrupted macroblocks by subtracting the last macroblock count from the current macroblock count.

Figure 6:
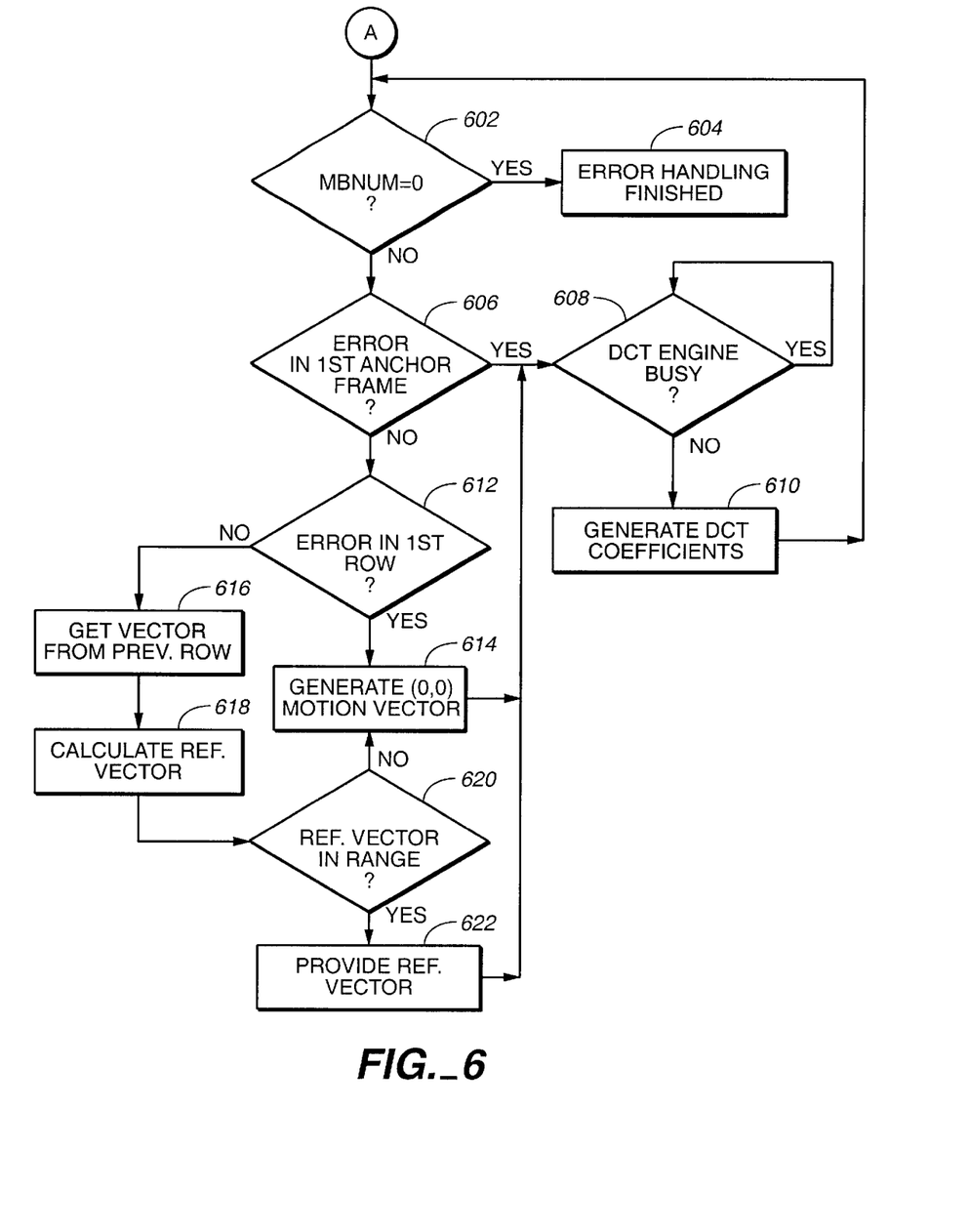
FIG. 6 is a flowchart illustrating a second aspect of the operation of an error handler.

Turning now to FIG. 6, after the error handler 416 computes the number corrupted macroblocks, it begins a loop in block 602 by checking to see if the number of corrupted macroblocks remaining is equal to zero. If the number of remaining macroblocks is equal to zero error handler 416 terminates the loop in block 604. Otherwise error handler 416 checks to see if the error was detected in the first anchor frame (i.e., there are no macroblocks in a previous frame for motion vectors to refer to). If so error handling 416 waits in block 608 until inverse DCT block 410 is ready to receive DCT coefficients. When inverse DCT block 410 is ready, error handler 416 provides a complete set of substitute DCT coefficients for one corrupted macroblock in block 610 and returns to block 602 after decrementing the remaining number of corrupted macroblocks. If the error was not detected in the first anchor frame, then in block 612 error handler 416 checks to see if the error was detected in the first row of the frame (i.e., there is no previous row to copy motion vectors from). If so error handler 416 generates a zero valued motion vector. Otherwise error handler 416 copies a motion vector from a corresponding macroblock in the previous row in block 616 and in block 618 shifts the motion vector downward one row, and computes the resultant motion vector from the top left corner of the picture. Error handler 416 verifies the motion vector is in range in block 620, and if so forwards the motion vector to spatial motion compensation block 412. If not, error handler 416 generates a zero valued motion vector in block 614 and similarly provides it to spatial motion compensation block 412. Error handler 416 subsequently returns to block 608 to wait until inverse DCT block 410 is ready to receive DCT coefficients.

Figure 7:
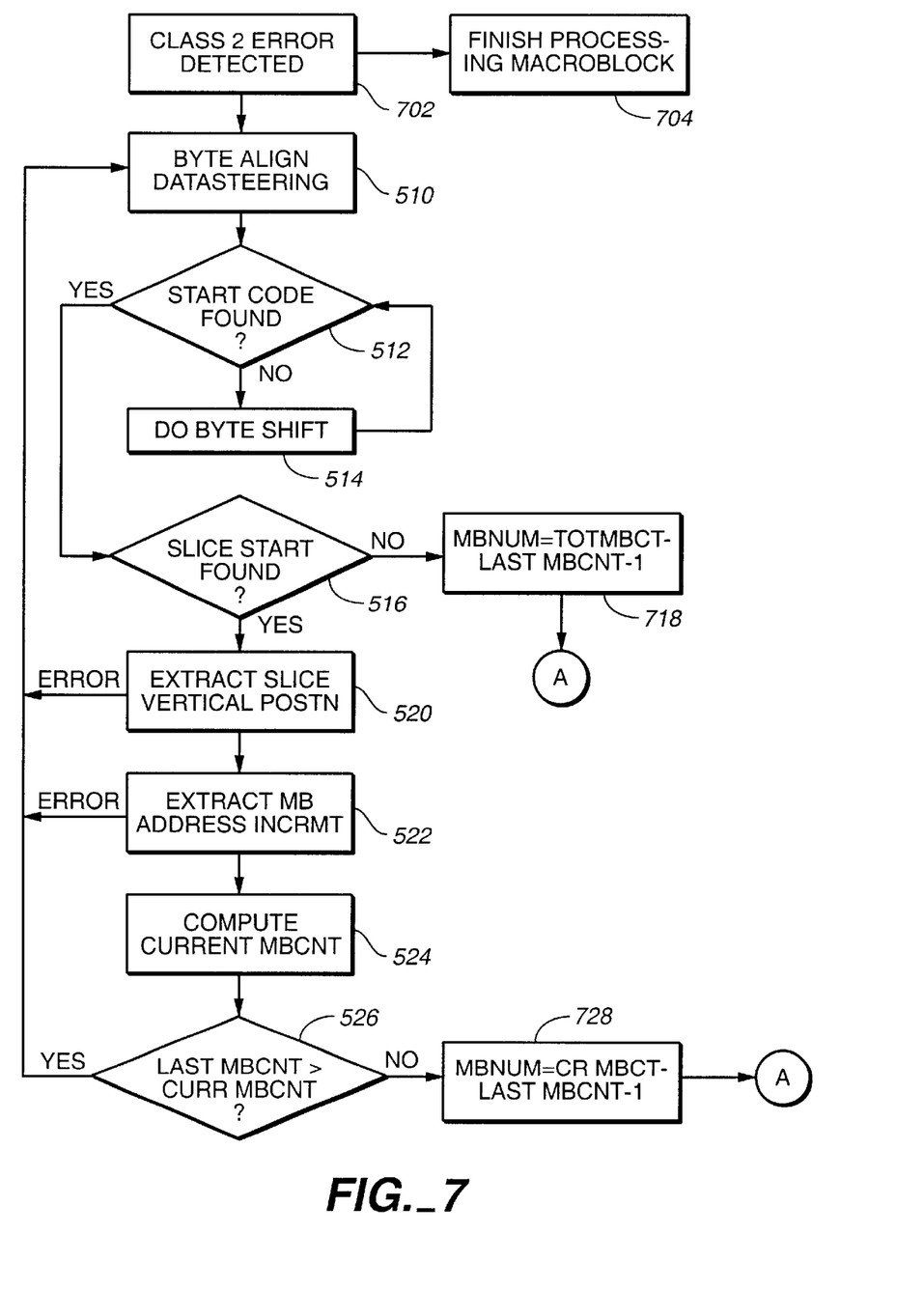
FIG. 7 is a flowchart illustrating a third aspect of the operation of an error handler.

Turning now to FIG. 7, error handler 416 is notified of the detection of a class 2 error in block 702. In block 704 error handler 416 finishes the processing of the current macroblock by substituting only the DCT coefficients and not substituting a motion vector. At the same time error handler 416 requests a byte alignment in block 510 and conducts a search for a start code in blocks 512 and 514. In the rest of flow chart of FIG. 7, the error handler 416 behaves as in FIG. 5, except that the calculation of the number of corrupted macroblocks is decreased by one to account for the fact that the processing of the current macroblock was allowed to proceed. Specifically in block 718 the number of corrupted macroblocks is found by subtracting the last macroblock count from one less than the total count of macroblocks up to the next slice, and in block 728 the number of corrupted macroblocks is found by subtracting the last macroblock count from one less than the current macroblock count.

Numerous variations and modifications will become apparent to those skilled in the art once the above disclosure is fully appreciated. It is intended that the following claims be interpreted to embrace all such variations and modifications.

What is claimed is:

1. A video decoder with robust error handling and concealment, wherein the video decoder comprises:

a VLC (variable length code) decoder configured to receive an encoded slice of macroblocks, configured to decode the encoded slice of macroblocks into a sequence of DCT (discrete cosine transform) coefficient matrices, and further configured to provide an error signal indicating the detection of syntactic, semantic, and VLC errors in the encoded slice of macroblocks;

an inverse DCT circuit coupled to receive the sequence of DCT coefficient matrices from the VLC decoder and configured to convert the sequence of DCT coefficient matrices into a sequence of image difference blocks; and an error handler coupled to receive the error signal from the VLC decoder and configured to responsively determine a corrupted macroblock and to responsively initiate a search for a next encoded slice of macroblocks, wherein the error handler is coupled to the inverse DCT circuit to replace the DCT coefficient matrix of the corrupted macroblock with a substitute DCT coefficient matrix.

2. The video decoder of claim 1, wherein the DCT coefficient matrices include a zero-frequency coefficient and a plurality of higher-frequency coefficients, wherein the higher-frequency coefficients of the substitute DCT coefficient matrix are set to zero.

3. The video decoder of claim 2, wherein the zero-frequency coefficient of the substitute DCT coefficient matrix is set equal to the zero-frequency coefficient of a previous uncorrupted DCT coefficient matrix.

4. The video decoder of claim 1, wherein the error handler is further configured to determine a position of a first macroblock in the next encoded slice.

5. The video decoder of claim 4, wherein the error handler is further configured to determine a number of corrupted macroblocks by determining a difference between the position of the first macroblock in the next slice of macroblocks and a position of a last uncorrupted macroblock.

6. The video decoder of claim 4, wherein the error handler is further configured to determine a number of corrupted macroblocks by determining a number of remaining macroblocks up to a next slice.

7. The video decoder of claim 1, wherein the VLC decoder is further configured to decode the encoded slice of macroblocks to produce a sequence of motion vectors, and wherein the video decoder further comprises:

a motion compensator coupled to receive the sequence of motion vectors from the VLC decoder and configured to retrieve a reference image block for each motion vector to produce a sequence of reference image blocks; and a combiner coupled to receive the sequence of image difference blocks from the inverse DCT circuit, coupled to receive the sequence of reference image blocks from the motion compensator, and configured to combine the sequences to form a sequence of decoded image blocks.

8. The video decoder of claim 7, wherein the error handler is coupled to the motion compensator to replace the motion vector of the corrupted macroblock with a substitute motion vector.

9. The video decoder of claim 8, wherein the substitute motion vector is set equal to a zero vector.

10. The video decoder of claim 8, wherein the substitute motion vector is set equal to a motion vector from a corresponding macroblock in a previous macroblock row.

11. The video decoder of claim 10, wherein the motion vector from the corresponding macroblock in the previous macroblock row is stored in a concealment memory.

12. The video decoder of claim 1, wherein the error handler comprises:
 a central error handler circuit coupled to receive the error signal from the VLC decoder and configured to responsively assert a DCT matrix replacement signal; and
 a DCT error handler circuit coupled to receive the DCT matrix replacement signal from the central error handler and configured to responsively provide the substitute DCT coefficient matrix.

13. The video decoder of claim 12, wherein the central error handler is further configured to assert a search signal in response to the error signal, wherein the error handler further comprises a search circuit coupled to receive the search signal from the central error handler, configured to search for a next encoded slice of macroblocks, and configured to provide a next slice header.

14. The video decoder of claim 13, wherein the error handler further comprises a macroblock position determination circuit configured to receive the next slice header and configured to responsively determine the position of the first macroblock in the next slice.

15. The video decoder of claim 14, wherein the error handler further comprises a corruption count determination circuit configured to receive the position of the first macroblock in the next slice and configured to responsively determine the number of corrupted macroblocks.

16. The video decoder of claim 13, wherein the central error handler is further configured to responsively assert a motion vector replacement signal, and wherein the error handler further comprises:
 a concealment memory coupled to the VLC decoder to buffer a previous row of macroblock motion vectors; and
 a motion error handler circuit coupled to receive the motion vector replacement signal and configured to responsively retrieve a motion vector from the concealment memory.

17. The video decoder of claim 16, wherein the motion error handler is further configured to adjust the retrieved motion vector downward by one macroblock row to determine an adjusted motion vector.

18. A video decoder with robust error handling and concealment, wherein the video decoder comprises:
 a VLC (variable length code) decoder configured to receive an encoded slice of macroblocks, configured to decode the encoded slice of macroblocks into a sequence of DCT (discrete cosine transform) coefficient matrices, and further configured to provide an error signal indicating the detection of errors in the encoded slice of macroblocks;
 an inverse DCT circuit coupled to receive the sequence of DCT coefficient matrices from the VLC decoder and configured to convert the sequence of DCT coefficient matrices into a sequence of image difference blocks; and
 an error handler which includes:
 a central error handler circuit coupled to receive the error signal from the VLC decoder and configured to responsively assert a DCT matrix replacement signal, wherein the central error handler is further configured to responsively assert a motion vector replacement signal;
 a DCT error handler circuit coupled to receive the DCT matrix replacement signal from the central error handler and configured to responsively provide a substitute DCT coefficient matrix;
 a concealment memory coupled to the VLC decoder to buffer a previous row of macroblock motion vectors; and
 a motion error handler circuit coupled to receive the motion vector replacement signal and configured to responsively retrieve a motion vector from the concealment memory, wherein the motion error handler is further configured to adjust the retrieved motion vector downward by one macroblock row to determine an adjusted motion vector, and wherein the motion error handler is further configured to determine if the adjusted motion vector is in range, wherein the motion error handler provides the adjusted motion vector to the motion compensator if the adjusted motion vector is in range, and wherein the motion error handler provides a zero vector to the motion compensator if the adjusted motion vector is not in range.

19. An error handler for a video decoder, wherein the error handler comprises:
 a central error handler circuit configured to receive an error signal from a VLC decoder and configured to responsively assert a DCT matrix replacement signal, wherein the central error handler is further configured to assert a search signal in response to the error signal;
 a DCT error handler circuit coupled to receive the DCT matrix replacement signal from the central error handler and configured to responsively provide a substitute DCT coefficient matrix; and
 a search circuit coupled to receive the search signal from the central error handler, configured to search for a next encoded slice of macroblocks, and configured to provide a next slicer header.

20. The error handler of claim 19, wherein the substitute DCT coefficient matrix includes a zero-frequency coefficient and a plurality of higher-frequency coefficients, wherein the higher-frequency coefficients of the substitute DCT coefficient matrix are set to zero.

21. The error handler of claim 20, wherein the zero-frequency coefficient of the substitute DCT coefficient matrix is set equal to zero.

22. The error handler of claim 19, wherein the error handler further comprises a macroblock position determination circuit configured to receive the next slice header and F Reconfigured to responsively determine a position of a first macroblock in the next encoded slice of macroblocks.

23. The error handler of claim 22, wherein the error handler further comprises a corruption count determination circuit configured to receive the position of the first macroblock in the next encoded slice of macroblocks and configured to responsively determine a number of corrupted macroblocks.

24. The error handler of claim 19, wherein the central error handler is further configured to responsively assert a motion vector replacement signal, and wherein the error handler further comprises:
- a concealment memory coupled to the VLC decoder to buffer a previous row of macroblock motion vectors; and
- a motion error handler circuit coupled to receive the motion vector replacement signal and configured to responsively retrieve a motion vector from the concealment memory.

25. The error handler of claim 24, wherein the motion error handler is further configured to adjust the retrieved motion vector downward by one macroblock row to determine an adjusted motion vector.

26. An error handler for a video decoder, wherein the error handler comprises:
- a central error handler circuit configured to receive an error signal from a VLC decoder and configured to responsively assert a DCT matrix replacement signal, wherein the central error handler is further configured to responsively assert a motion vector replacement signal; and
- a DCT error handler circuit coupled to receive the DCT matrix replacement signal from the central error handler and configured to responsively provide a substitute DCT coefficient matrix;
- a concealment memory coupled to the VLC decoder to buffer a previous row of macroblock motion vectors; and
- a motion error handler circuit coupled to receive the motion vector replacement signal and configured to responsively retrieve a motion vector from the concealment memory, wherein the motion error handler is further configured to adjust the retrieved motion vector downward by one macroblock row to determine an adjusted motion vector, and wherein the motion error handler is further configured to determine if the adjusted motion vector is in range, wherein the motion error handler provides the adjusted motion vector to a motion compensator if the adjusted motion vector is in range, and wherein the motion error handler provides a zero vector to the motion compensator if the adjusted motion vector is not in range.

* * * * *